Jan. 12, 1971   G. G. BERGH ET AL   3,553,822
METHOD OF FABRICATING A COVERED BOX CONSTRUCTION
Original Filed Feb. 15, 1968   3 Sheets-Sheet 1

INVENTORS
GEORGE G. BERGH
ROBERT G. BERGH

*Russell, Chittick & Pfund*
ATTORNEYS

Jan. 12, 1971   G. G. BERGH ET AL   3,553,822
METHOD OF FABRICATING A COVERED BOX CONSTRUCTION
Original Filed Feb. 15, 1968   3 Sheets-Sheet 2

INVENTORS
GEORGE G. BERGH
ROBERT G. BERGH

ATTORNEYS 3,553,822
METHOD OF FABRICATING A COVERED BOX CONSTRUCTION
George G. Bergh and Robert G. Bergh, North Attleboro, Mass., assignors to Bergh Bro. Co., Inc., Attleboro Falls, Mass.
Original application Feb. 15, 1968, Ser. No. 705,836, now Patent No. 3,426,938, dated Feb. 11, 1969. Divided and this application Aug. 27, 1968, Ser. No. 755,617
Int. Cl. B23p 9/00
U.S. Cl. 29—445     2 Claims

ABSTRACT OF THE DISCLOSURE

A method of fabricating a decoratively covered box component of the type having a bottom member with a continuous wall member extending vertically from the peripheral edge thereof. The method includes the steps of covering the bottom member and at least a portion of the wall member with a blank of cloth, paper or similar flexible sheet material. While the sheet material is held in a taut condition, a rim member is employed in cooperation with the wall member to hold the sheet material in place, the exposed surfaces of the latter thereafter remaining taut and movable relative to the box component surfaces over which it extends.

RELATED INVENTIONS

This application is a division of U.S. patent application Ser. No. 705,836, filed Feb. 15, 1968, now Pat. No. 3,426,938, by George G. Bergh and Robert G. Bergh for Covered Box Construction and Method of Fabricating Same.

DESCRIPTION OF THE INVENTION

This invention relates generally to box constructions, and more particularly to a method for applying an improved decorative covering to box components having bottoms with continuous side walls extending vertically therefrom.

It frequently becomes desirable to apply a decorative covering to box components, such as for example base and lid sections, so as to enhance their overall appearance. This is particularly true of boxes, trays and cases used for containing or displaying jewelry and the like. It has heretofore been the practice when covering boxes of this type to apply flexible decorative sheet material to the outer box surfaces by means of adhesives. A number of problems and disadvantages are, however, inherent in this practice. For example, it has been found that adhesives tend to stiffen the otherwise flexible sheet material being employed as a covering, thus adversely affecting the soft pliable texture being sought. Moreover, where metal box components are being employed, as is often the case, all surfaces must first be thoroughly cleaned so as to remove any oil or dirt picked up during previous fabricating steps. Otherwise, the adhesives will not function properly. Such cleaning steps are expensive and in addition, render the metal surfaces vulnerable to rusting. Thus, special care must be taken when handling and storing the cleaned metal box components prior to covering.

Many of the adhesives currently being employed are of the heat-sensitive type. This severely restricts the types of decorative sheet material that can be used as coverings because certain materials can be damaged by the heat and pressure required to set such adhesives. These are but a few of the problems associated with the use of adhesives in the fabrication and assembly of covered box elements.

The present invention avoids the problems mentioned above by relying on means other than adhesives for applying a flexible sheet material covering to the exposed surfaces of box elements. In the embodiments to be presently described in greater detail, this is accomplished by employing a rim in cooperative engagement with the box wall member to grip and hold the sheet material in place. Due to the absence of adhesives, the sheet material retains its natural state of resiliency. Moreover, all exposed areas of the sheet material are movable relative to the underlying covered surfaces of the box element. The combination of both of these factors produces an "upholstered" effect which has heretofore been impossible to obtain with the conventional practices currently being employed.

It is also important to note that the gripping action of the rim affects only areas of the sheet material overlapped by the rim itself. Thus, a wide range of sheet materials may be employed without fear of marring or otherwise damaging any of the exposed sheet material during the covering process. Since no expensive preliminary operations are required to clean or otherwise prepare the surfaces of the box elements, the box manufacturer realizes additional significant labor and material savings.

In addition to the problems associated with the use of adhesives, other disadvantages are also inherent in conventional practices now being employed. More particularly, the flexible sheet materials are normally applied in such a manner as to cover all of the outer surfaces of the box element, even to the point of overlapping the inside surfaces of the continuous wall member. In order to avoid unsightly wrinkling at the corners of the wall members, the corners of the sheet material blanks are usually mitred and subsequently folded. Although this succeeds in avoiding wrinkles, the resulting folds and exposed raw edges of the sheet material detract from the overall appearance of the covering. Where the blanks of sheet material are not mitred and folded, the box corners are unavoidably characterized by distortion and wrinkling due to the tendency of the sheet material to gather at these points. The present invention avoids these disadvantages by pulling the sheet material taut over the bottom member and up along the wall member to a point just below that at which wrinkling and gathering of material begins to take place. The remainder of the wall member is covered by the rim which overlaps and grips the sheet material. In addition to imparting a much improved appearance, this practice offers the added advantage of saving an appreciable amount of sheet material.

A further significant advantage is gained when the above-described covering is employed with non-metallic box components such as for example, those fabricated of a relatively pliable heavy paper or cardboard. More particularly, it has been found that a flat pre-cut blank of a scored cardboard can be bent into the desired box shape, and a decorative covering applied to the exposed surfaces of the bottom member and wall member thus formed, all in a single operation. This can be accomplished with the same tools and fixtures used to cover preformed metal box components, again without resorting to adhesives. In this case, the box component is held together by the decorative sheet material and surrounding rim.

Other important advantages and objectives of the present invention will become more apparent as the description proceeds with the aid of the accompanying drawings in which.

When viewing the above drawings in connection with the following description, it should be understood that certain dimensions, such as for example, the width of flanges and the thickness of materials, have been exaggerated for the purposes of illustration.

Figure 1:
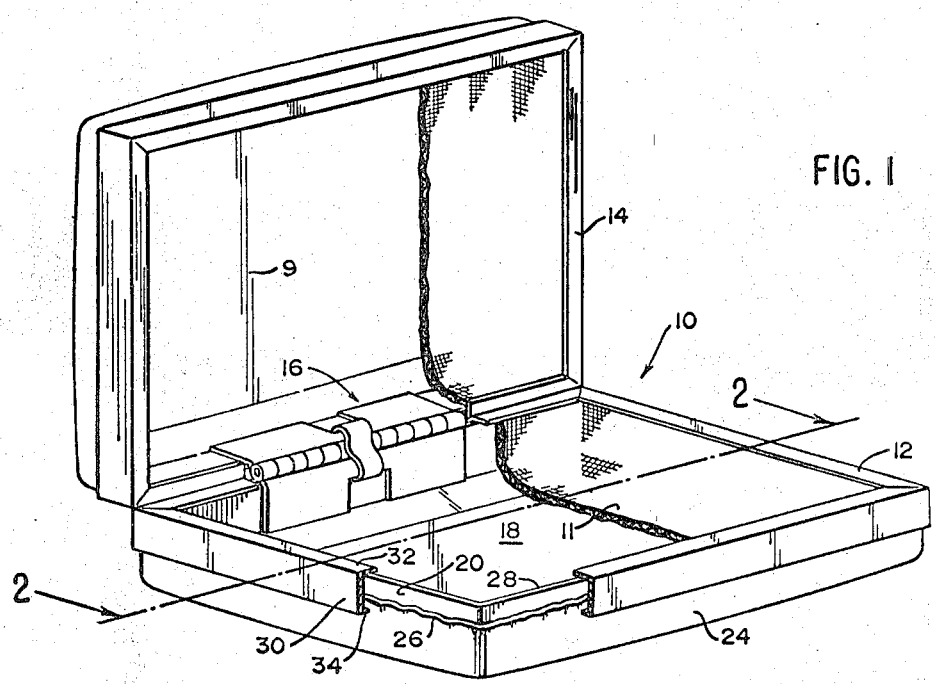
FIG. 1 is a perspective view of a box fabricated in accordance with the concepts of the present invention, with portions of the base component broken away.

Referring initially to FIG. 1, a box of the type covered by the method of the present invention is generally indicated by the reference numeral 10. Box 10 includes a base 12 to which is pivotally joined a lid 14 by means of a hinge 16 of known construction. Both base element 12 and lid 14 are identically constructed, and thus the following description will proceed with reference primarily to base 12.

Figure 2:
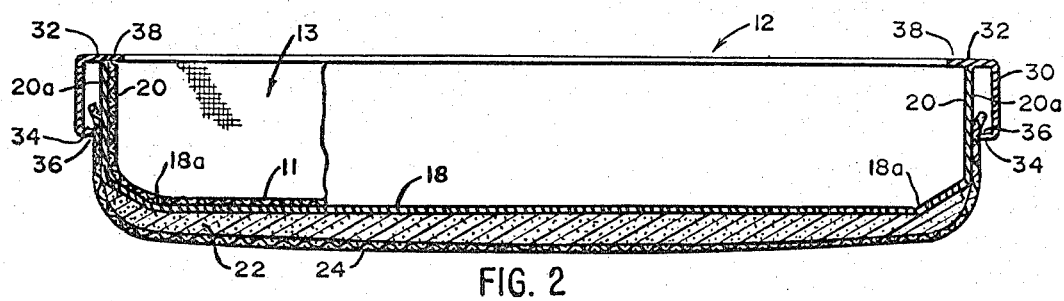
FIG. 2 is a sectional view on a greatly enlarged scale taken along line 2—2 of FIG. 1.

As can be best seen by further reference to FIG. 2, base 12 includes an inner box element 13 which is comprised of a bottom member 18 having a continuous wall member 20 extending upwardly from the peripheral edge thereof. As herein employed, the term "bottom member" is intended to broadly include any horizontal surface having a continuous wall member extending vertically therefrom. Thus, the top surface 9 of lid 14 would also fall within this definition.

Box elements of the above type are frequently fabricated from relatively thin gauged metal, such as for example sheet steel, which has previously been cut into appropriately sized blanks. The blanks are stamped into the desired shapes and sizes without particular regard to overall appearance, it being understood that decorative coverings will subsequently be applied.

In the embodiment illustrated in FIGS. 1 and 2, the stamped metal box element 13 is covered in the following manner: a padding element 22 of resilient pliable material such as for example, urethane foam, is first attached to the outer surface of bottom member 18. Padding element 22 is an optional feature which need not necessarily be included in all box constructions. Padding element 22 is in turn covered by a blank of flexible sheet material 24. Sheet material 24 can comprise any one of a number of commonly available decorative materials such as for example synthetic rayons, velvet, satin, cotton-based fabrics, etc. The sheet material is pulled taut in a manner to be presently described in greater detail, extending around the peripheral edge 18a of bottom 18 and up along continuous wall member 20 to a line 26 spaced below and approximately parallel to the upper wall edge 28. Line 26 defines the point above which unsightly gathering and wrinkling will begin to take place.

The remaining portion of wall member 20 extending upwardly beyond the area covered by sheet material 24 is covered by a decorative rim 30. As shown in FIGS. 1 and 2 rim 30 is provided with upper and lower inwardly disposed flanges 32 and 34. The width of upper flange 32 exceeds that of lower flange 34 by an amount at least equal to and preferably greater than the thickness of sheet material 24. Lower flange 34 cooperates with the outer surface 20a of wall member 30 in gripping and frictionally securing the sheet material 24 as at 36. The upper flange 32 overlaps and extends beyond the upper edge of wall member 20 to form a lip 38. In this manner, flange 32 cooperates with the upper edge of wall member 20 in vertically locating the rim 30 on the box element, the inwardly extending lip 38 further providing a means of retaining an inner cloth liner 11 in the box element.

As mentioned previously, flexible sheet material 24 is in a taut condition, its natural resiliency having been retained due to the absence of any adhesive. Also, the sheet material is gripped and secured as at 36 along a line overlapped by rim 30. Thus, all exposed areas of the sheet material are movable relative to the underlying covered surfaces. Experience has indicated that these two factors contribute markedly to an improved and more pleasing texture, one which is practically identical to the "upholstered" effect achieved with furniture coverings.

Figure 5:
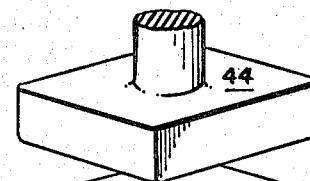
FIG. 5 is a perspective view of an apparatus which may be employed in the practice of the present invention.

An example of an apparatus which may be employed in fabricating the box illustrated in FIGS. 1 and 2 will now be described with further reference to FIG. 5. The apparatus basically includes a table or plate 40 having a cavity 42 located therein. A punch member 44 is mounted in a position overlying cavity 42 for vertical movement relative to the table 40.

The operative sequence of the apparatus shown in FIG. 5 will now be described with further reference to FIGS. 6A–6C. In FIG. 6A, punch 44 is in a raised position overlying cavity 42. A pre-cut blank of sheet material 24 is initially placed over cavity 42, its edges being in approximate parallel alignment with the cavity walls. An inner box element 13 previously stamped from sheet steel is attached to the underside of punch 44 by any convenient means, such as for example, a permanent magnet 46 mounted in a cavity on the lower punch face. At this point, a padding element 22 has already been attached to the outer surface bottom member 18.

Figure 6B:
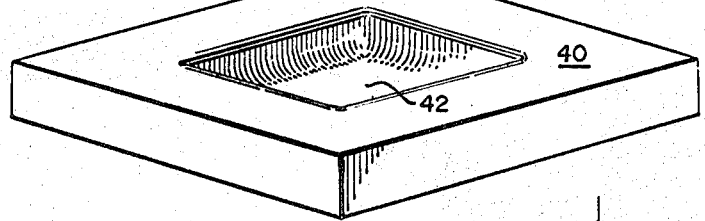
FIGS. 6A–6C are schematic illustrations depicting the operational sequence of the apparatus shown in FIG. 5 when covering a preformed metallic box component.
Figure 6B:
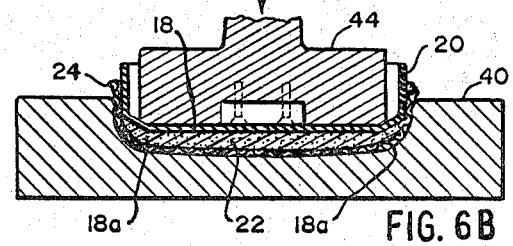
Figure 6A:
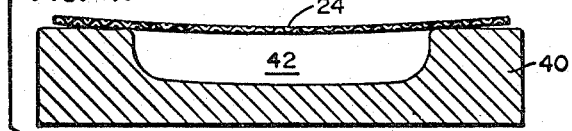
Figure 6C:
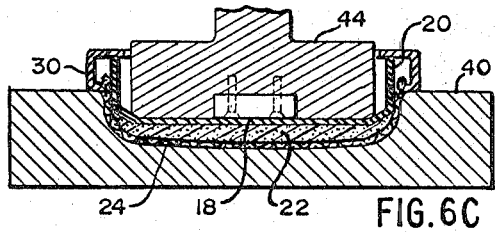

The punch 44 and inner box element 13 are then lowered into cavity 42 as shown in FIG. 6B. When this occurs, the wall member 20 of the box element cooperates with the cavity walls to frictionally grip that sheet material 24. The sheet material is thus pulled taut around the peripheral edge 18a of bottom member 18 and then upwardly along wall member 20.

Figure 7:
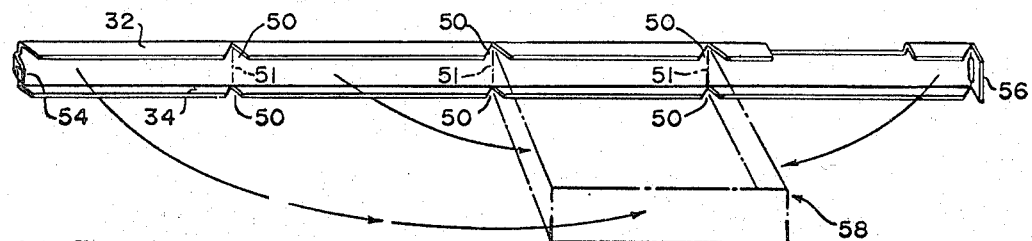
FIG. 7 is a perspective view of a typical rim member prior to its application to a box element in accordance with the present invention.

With the covering thus held in taut condition, the next step involves positioning rim 30 in place. Prior to its application to the box element, the rim (see FIG. 7) is in the form of an elongated strip with notches 50 in the flanges 32 and 34 defining the transvrse lines 51 along which bending will take place. As indicated schematically in FIG. 7, the rim is bent during mounting on the box element, its male end 54 subsequently being locked to the female end 56 at one corner as at 58. The upper rim flange 32 overlaps the upper edge of wall member 20 to vertically locate the rim on the box element. The lower flange 34 cooperates with the outer surface 20a of wall member 20 in frictionally gripping the sheet material 24 therebetween. Once rim 30 is locked in place as shown in FIG. 6C, punch 44 is raised and the wrapped box element removed therefrom.

Figure 8:
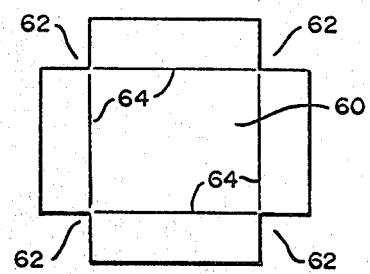
FIG. 8 is a plan view of a pre-cut scored blank of cardboard or similar material prior to its being shaped and covered.

As mentioned previously, this basic method may also be employed to simultaneously fabricate and cover non-metallic box elements of the type which employ more pliable materials such as heavy paper, cardboard, etc. For example, FIG. 8 illustrated a blank 60 of relatively heavy cardboard, the corners of which are mitred or cut away as at 62. The under surface of blank 60 is scored as at 64 to facilitate bending during the subsequent fabrication and covering operation.

Figure 9B:
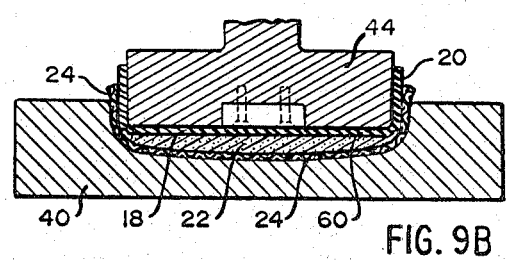
FIGS. 9A–9C are schematic illustrations depicting the steps employed when shaping and covering the cardboard blank shown in FIG. 8.
Figure 9A:
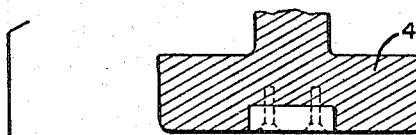
Figure 9C:
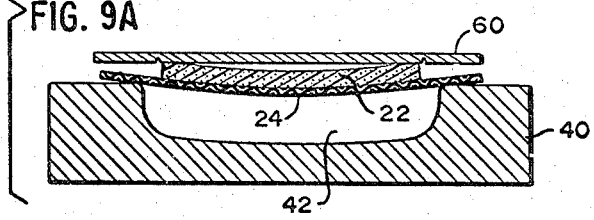
Figure 9C:
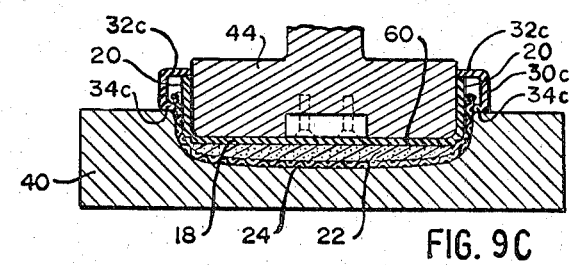

The method of incorporating blank 60 into a covered box construction is illustrated in FIGS. 9A–9C. In FIG. 9A a blank of decorative sheet material 24 is again positioned over the cavity 42 of a base plate 40. An intermediate padding member 22 is then placed on the material 24. Finally, padding element 22 is covered by the cardboard blank 60, the score lines 64 being on the undersurface.

Thus it can be seen that the initial fabricating step simply involves stacking components 24, 22 and 60 over cavity 42. Once this has been accomplished, punch 44 is lowered to collectively force all of the stacked components into the cavity as shown in FIG. 9B. Blank 60 is bent along the score lines 64 to form an inner box element having a bottom member 18 with a continuous wall member 20 extending upwardly from the peripheral edge thereof. The decorative sheet material 24 is again pulled taut by being frictionally engaged between the outer surface of wall member 20 and the cavity wall, the former in this case receiving support from the sides of punch 44. The final step involves application of the rim member 30c as shown in FIG. 9C. The upper flange 32c of rim member 30c is in this case of a lesser width so as to avoid bearing against the sides of punch 44. The lower flange 34c again cooperates with wall member 20 to frictionally secure the decorative sheet material covering 24 therebetween. Once this has been accomplished, punch 44 is raised, thus freeing the covered box element for removal from the apparatus.

Figure 3:
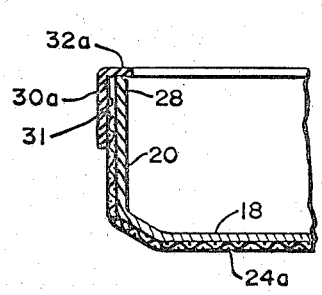
FIG. 3 is a partial sectional view similar to FIG. 2 showing an alternate embodiment of the invention.

Having thus described several embodiments of box elements employing the present invention together with the methods of assembling the same, it should now be apparent to those skilled in the art that a number of modifications may be made to certain features and components without departing from the basic inventive concepts herein set forth. For example, under certain circumstances, it may be desirable to employ a thicker decorative sheet material, thus obviating the necessity for employing the optional intermediate padding element 22. Such a construction is partially illustrated in FIG. 3 wherein the thicker sheet material 24a is stretched tightly over the outer surfaces of the bottom 18 and continuous wall member 20 of the box element. It may also be desirable to employ a slightly modified rim 30a again as shown in FIG. 3, with only an upper flange 32a overlapping the upper edge 28 of wall member 20 to a point flush with the interior surfaces thereof. With this construction, the sheet material 24a would be frictionally held between the outer surface of wall member 20 and the inner face 31 of rim 30a.

Figure 4:
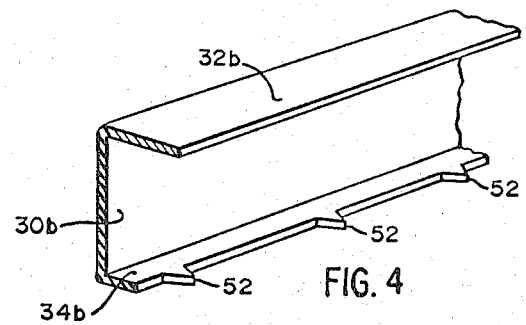
FIG. 4 is a partial perspective view of a rim member with a modified lower flange provided with inwardly disposed sharp prongs.

Another modification to the rim is shown in FIG. 4 wherein a rim 30b is provided with upper and lower flanges 32b and 34b, the latter being provided along its inner edge with pointed prongs 52 designed to pierce the sheet material being employed as a covering. This modification thus exerts a combined frictional and mechanical holding action on the sheet material.

In view of the foregoing, it should now be apparent that the present invention embodies a number of basic concepts and important advantages not provided by the conventional practices and box constructions previously available to those skilled in the art. Of particular importance is the manner of securing the decorative sheet material 24 by means of a rim 30 instead of adhesives. This greatly simplifies the fabricating procedure by obviating the necessity for expensive preliminary treatment of metallic surfaces, which in turn necessitates special handling to avoid corrosion. The sheet material retains its natural state of flexibility, and a greater range of materials are made available without regard to their sensitivities to heat and pressure. This method of covering is applicable with box elements of all shapes and sizes. Also less covering material is employed because the material is not pulled up over the entire outer surface of wall member 20 and then overlapped over upper edge 28 into the interior of the box component. Most important of all, however, is the fact that the resulting box construction is characterized by an expensive "upholstered" appearance, which has heretofore been unobtainable in items of this type.

It is our intention to cover all changes and modifications of the embodiments of the invention herein chosen for purposes of disclosure which do not depart from the spirit and scope of the invention.

We claim:
1. A method of fabricating a decoratively covered box element of the type having a bottom member with a continuous wall member extending vertically from the peripheral edge thereof, said method comprising: placing a piece of flexible covering material over a cavity, the said covering material being suitably dimensioned to extend beyond the edges of said cavity; overlying said sheet material with a substantially flat blank, the said blank having score lines in registration with the edges of the underlying cavity; forcing the combination of said blank and said flexible covering down into said cavity, thus causing the blank to bend along said score lines to form a box element with a bottom and a continuous side wall, the said side wall cooperating with the interior surface of said cavity in gripping and pulling the said covering material taut; and, affixing a rim member to said side wall, said rim member cooperating with the exterior surface of said side wall to grip and hold said flexible covering in a taut condition.

2. The method as claimed in claim 1 further characterized by the step of positioning an intermediate padding element between said flexible covering and said blank prior to facing the combination of covering, padding element and blank down into said cavity.

References Cited

UNITED STATES PATENTS

| | | | |
|---|---|---|---|
| 479,743 | 7/1892 | Headly et al. | 29—445 |
| 1,294,486 | 2/1919 | Kuen | 29—445 |
| 2,165,379 | 7/1939 | Hiers | 29—Tens. Dig. UX |
| 2,357,037 | 8/1944 | Wheary | 29—455UX |
| 2,581,615 | 1/1952 | Whitelaw | 206—75X |
| 2,618,381 | 11/1952 | Gilbert | 206—75 |
| 2,845,699 | 8/1958 | Woodard | 29—445UX |
| 3,041,717 | 7/1962 | Brown | 29—446 |
| 3,168,917 | 2/1965 | Bartels | 29—509X |
| 3,363,730 | 1/1968 | Guss | 190—53X |

CHARLIE T. MOON, Primary Examiner

U.S. Cl. X.R.

29—446, 509, 526